(12) United States Patent
Snibbe

(10) Patent No.: US 6,923,079 B1
(45) Date of Patent: Aug. 2, 2005

(54) RECORDING, TRANSMISSION AND/OR PLAYBACK OF DATA REPRESENTING AN AIRFLOW

(76) Inventor: Scott S. Snibbe, 541 Mississippi St., San Francisco, CA (US) 94107

(*) Notice: Subject to any disclaimer, the term of this patent is extended or adjusted under 35 U.S.C. 154(b) by 0 days.

(21) Appl. No.: 09/999,783

(22) Filed: Oct. 31, 2001

(51) Int. Cl.⁷ .................................................. G01D 7/02
(52) U.S. Cl. ..................... 73/866.1; 73/866.1; 73/866.3; 73/23.34; 422/84; 436/900; 128/200.24; 128/200.26
(58) Field of Search ............................ 73/866.1, 866.3, 73/23.34; 422/84; 436/900

(56) References Cited

U.S. PATENT DOCUMENTS

| | | | |
|---|---|---|---|
| 4,718,096 A | * 1/1988 | Meisel | 381/361 |
| 5,161,541 A | 11/1992 | Bowman et al. | 128/724 |
| 5,347,843 A | 9/1994 | Orr et al. | 73/3 |
| 5,518,002 A | 5/1996 | Wolf et al. | 128/725 |
| 5,582,182 A | 12/1996 | Hillsman | 128/716 |
| 5,622,164 A | * 4/1997 | Kilis et al. | 128/200.24 |
| 5,680,505 A | * 10/1997 | Ho | 704/251 |
| 5,710,380 A | * 1/1998 | Talley et al. | 73/861.85 |
| 5,724,256 A | * 3/1998 | Lee et al. | 422/105 |
| 5,765,563 A | 6/1998 | Vander Schaaf | 128/725 |
| 5,800,360 A | 9/1998 | Kisner et al. | 600/532 |
| 5,872,564 A | 2/1999 | Snibbe et al. | 345/302 |
| 5,886,710 A | 3/1999 | Snibbe | 345/473 |
| 5,901,704 A | 5/1999 | Estes et al. | 128/204.23 |
| 5,917,549 A | 6/1999 | Simons et al. | 348/441 |
| 5,929,867 A | 7/1999 | Herbstman et al. | 345/474 |
| 5,939,645 A | 8/1999 | Kellerman | 73/861.94 |
| 6,115,051 A | 9/2000 | Simons et al. | 345/442 |
| 6,158,432 A | 12/2000 | Biondi et al. | 128/204.21 |
| 6,183,423 B1 | 2/2001 | Gaumond et al. | 600/529 |
| 6,203,502 B1 | * 3/2001 | Hilgendorf et al. | 128/200.11 |
| 6,421,617 B2 | 7/2002 | Felsenstein et al. | 702/50 |

FOREIGN PATENT DOCUMENTS

EP      0 651 971 A1     5/1995

* cited by examiner

Primary Examiner—Hezron Williams
Assistant Examiner—André K. Jackson
(74) Attorney, Agent, or Firm—David R. Graham

(57) ABSTRACT

Data representing one or more characteristics of an input airflow (e.g., an airflow associated with a human being, such as breath or an airflow resulting from motion of the human being, or a wind tunnel airflow) is acquired and, if necessary or desirable, processed, then stored, transmitted to a remote location, and/or played back. Playback of acquired airflow data entails generating a display airflow corresponding to the input airflow. The characteristic of an airflow regarding which data is acquired is often the velocity of the airflow, though data regarding other airflow characteristics (e.g., direction, temperature, humidity, odor) can also be acquired in addition to, or instead of, airflow velocity.

55 Claims, 4 Drawing Sheets

RECORDING, TRANSMISSION AND/OR PLAYBACK OF DATA REPRESENTING AN AIRFLOW

BACKGROUND OF THE INVENTION

1. Field of the Invention

This invention relates to the acquisition of data representing an airflow, with subsequent storage, transmission and/or playback of that data.

2. Related Art

The primary means of representing a human being (or other animate object, such as an animal) over time in media has been through audio, visual and audiovisual recordings, such as audiotape and video. For example, motion capture has been used to record movement of an animate object (e.g., human) in order to recreate the movement in a computer-generated character, often of the same form as the animate object for which movement was recorded (e.g., an animated human character). Motion capture evolved from the notion of rotoscoping. Rotoscoping is the mechanical tracing of images of an animate object from a series of film frames as the frames are projected onto a piece of paper or other drawing surface. Either the actual image is traced or the image is used as a guide to draw an imaginary animated character. Movement of an animated character is produced from the series of traced images, the movement mimicking the movement of the image in the series of film frames.

Motion capture is typically accomplished through either electromechanical or optical means. Electromechanical motion capture can be accomplished by fitting an animate object (typically a human being) with a wearable apparatus that has sensors at the joints, such as potentiometers or strain gauges. As the animate object moves, the sensors transmit signals to a computer that then decodes the signals into appropriate numerical representations for use in a computer model of the movement. This type of motion capture is awkward because of the encumbering nature of the wearable apparatus.

Optical motion capture is accomplished by visually recording the movement of an animate object (and, in particular, parts of the animate object) with one or more cameras, sometimes attaching visual markers to key positions (such as joints) on the animate object. The recorded image is analyzed to identify the positions of parts of the animate object (and/or visual markers) during the movement and joint angles at each point in time are computed. For recording human movement, optical motion capture gets rid of the encumbrance of the wearable apparatus used in electromechanical motion capture. However, optical motion capture suffers from difficulty in tracking the parts of the animate object (and/or marker positions) in the recorded image. Furthermore, if a single camera is used to record the motion, positions of parts of the animate object (and/or marker positions) are measured only in two-dimensions, in which case three-dimensional position information must be inferred, often incorrectly. While techniques exist for addressing these difficulties, no perfect techniques yet exist.

Physical aspects of, or effects produced by, a human being other than those that can be seen or heard (such as breath or wind flows arising from movement) are normally recorded or played back only for medical applications. Recording and playback of data representing such physical aspects can be both valuable from a historical perspective (e.g., the breath of a historic individual) and/or medical perspective, and interesting from an entertainment and/or communication perspective.

The "In Touch" system developed at Massachusetts Institute of Technology by Hiroshi Ishii et al. is a system for transmitting human movement to a remote location through a haptic device. The haptic device includes three rollers situated in a room. A person can move a part of the person's body (e.g., a hand) against the rollers. The haptic device is connected electronically to a second, identical haptic device located in a different room. The rollers of the second haptic device move in the same manner as the rollers of the first haptic device against which the person moves. A second person can push on the rollers of the second haptic device and thereby engage the first person, thus simulating pushing of the first person by the second person. Though the "In Touch" system enables transmission of the effects of human movement to a remote location, it does not record or amplify that movement. Additionally, the "In Touch" system transmits a human being's action on a simple mechanical system, rather than trying to represent a human movement directly.

Measured airflows (e.g., wind, breath) provide an underutilized source of sensory information. A large number of devices exist for measuring the velocity of an airflow. Many of these devices are typically referred to as anemometers and function in various ways, including hot-wire devices that sense the velocity of the airflow based on a change in temperature induced by the airflow and mechanical impellers that sense the velocity of the airflow based on the rotational speed of the impeller induced by the airflow. Additionally, some medical devices measure breath by using a diaphragm mounted around a patient's chest to measure the change in volume of the chest as the patient breathes, the chest volume changes corresponding to the patient's breathing volume. However, while airflows are sometimes measured—in particular, wind is often measured for meteorological applications—and there are many methods for doing so, data concerning airflows has only been viewed and analyzed in abstract terms as tables of numbers, graphs and/or graphical visualizations. Currently, no devices exist for playing back a measured airflow by producing a display airflow that corresponds to the measured airflow. Additionally, no devices exist for transmitting data representing a measured airflow to a location remote from that at which the measured airflow occurs.

Airflows can also be simulated. A large body of work exists on computationally modeling airflows, much of which provides complex models of airflow dynamics. However, as with measured airflows, simulated airflows have previously been viewed and analyzed in abstract terms as tables of numbers, graphs and/or graphical visualizations. Currently, other than conventional wind tunnels (which produce a display airflow that corresponds to a "simulated" airflow having a single specified velocity), no devices exist for playing back a simulated airflow by producing a display airflow that corresponds to the simulated airflow.

SUMMARY OF THE INVENTION

According to the invention, data (airflow data) representing one or more characteristics of an input airflow can be acquired (and, if necessary or desirable, processed), then stored, transmitted to a remote location, and/or played back. The airflow data can be acquired by measuring data representing one or more characteristics of an actual airflow (measured airflow) or the airflow data can be acquired by accessing data representing one or more characteristics of a simulated airflow (modelled airflow). Storing of acquired airflow data enables an airflow to be displaced in time, i.e., stored airflow data can be played back at a future time. Transmission of acquired airflow data enables an airflow to be displaced in space, i.e., airflow data is transmitted across a distance to a remote location (and, typically, played back at that location). Playback of acquired airflow data entails generating a display airflow corresponding to the input airflow. The invention can be used, for example, to record, transmit and/or play back airflow data for an airflow produced by an animate object (e.g., a human being or an animal), such as the breath of an animate object or an airflow generated by movement of an object (e.g., movement of a leg or arm or a human being). The invention can also be used, for example, to record, transmit and/or play back airflow data for a wind tunnel airflow.

In one embodiment of the invention, data is acquired that represents a characteristic of a measured airflow, then a display airflow is produced in which the characteristic is reproduced in the display airflow in accordance with the acquired data. The acquired data can be transmitted from a first location at which the measured airflow occurs to a second location that is remote from the first location, so that the display airflow is produced at the second location. The acquired data can also be stored at the first location, the second location or both.

In another embodiment of the invention, data is acquired that represents a characteristic of a measured airflow that occurs at a first location, then the acquired data is transmitted from the first location to a second location that is remote from the first location. The acquired data can be stored at the first location, the second location or both.

In either of the above embodiments, the characteristic of an airflow regarding which data is acquired can be a velocity of the airflow, a direction of the airflow, a temperature of the airflow, a humidity of the airflow and/or an odor of the airflow. It is anticipated that, often, data regarding airflow velocity will be acquired. However, data regarding characteristics of an airflow other than airflow velocity can advantageously enhance the fidelity of the playback of airflow data. In either of the above embodiments, the airflow data can be acquired using a plurality of sensors arranged in an array.

In either of the above embodiments, data can also be acquired that represents a characteristic of a measured airflow that occurs at the second location, then that acquired data transmitted from the second location to the first location (and, if the invention is so implemented, displayed at the first location). Additionally, in either of the above embodiments, the airflow data can be transmitted between the first location and the second location via a communications network, such as a computer network, a video-conferencing network or a telephone network.

In yet another embodiment of the invention, data is acquired that represents a characteristic of a modelled airflow, the acquired airflow data representing a characteristic other than a uniform velocity of the modelled airflow, then a display airflow is produced in which the characteristic is reproduced in the display airflow in accordance with the acquired data. The characteristic of an airflow regarding which data is acquired can be a non-uniform velocity of the airflow, a direction of the airflow, a temperature of the airflow, a humidity of the airflow and/or an odor of the airflow.

In any of the above embodiments, the airflow data can be processed to transform the airflow data in a specified manner. For example, when the airflow data represents airflow velocity, the airflow data can be modified so that the velocity of the display airflow is increased or decreased with respect to the velocity of the measured or modelled airflow.

Additionally, in any of the above embodiments, the display airflow can be produced using a plurality of airflow output devices arranged in an array.

DETAILED DESCRIPTION OF THE INVENTION

Figure 1:
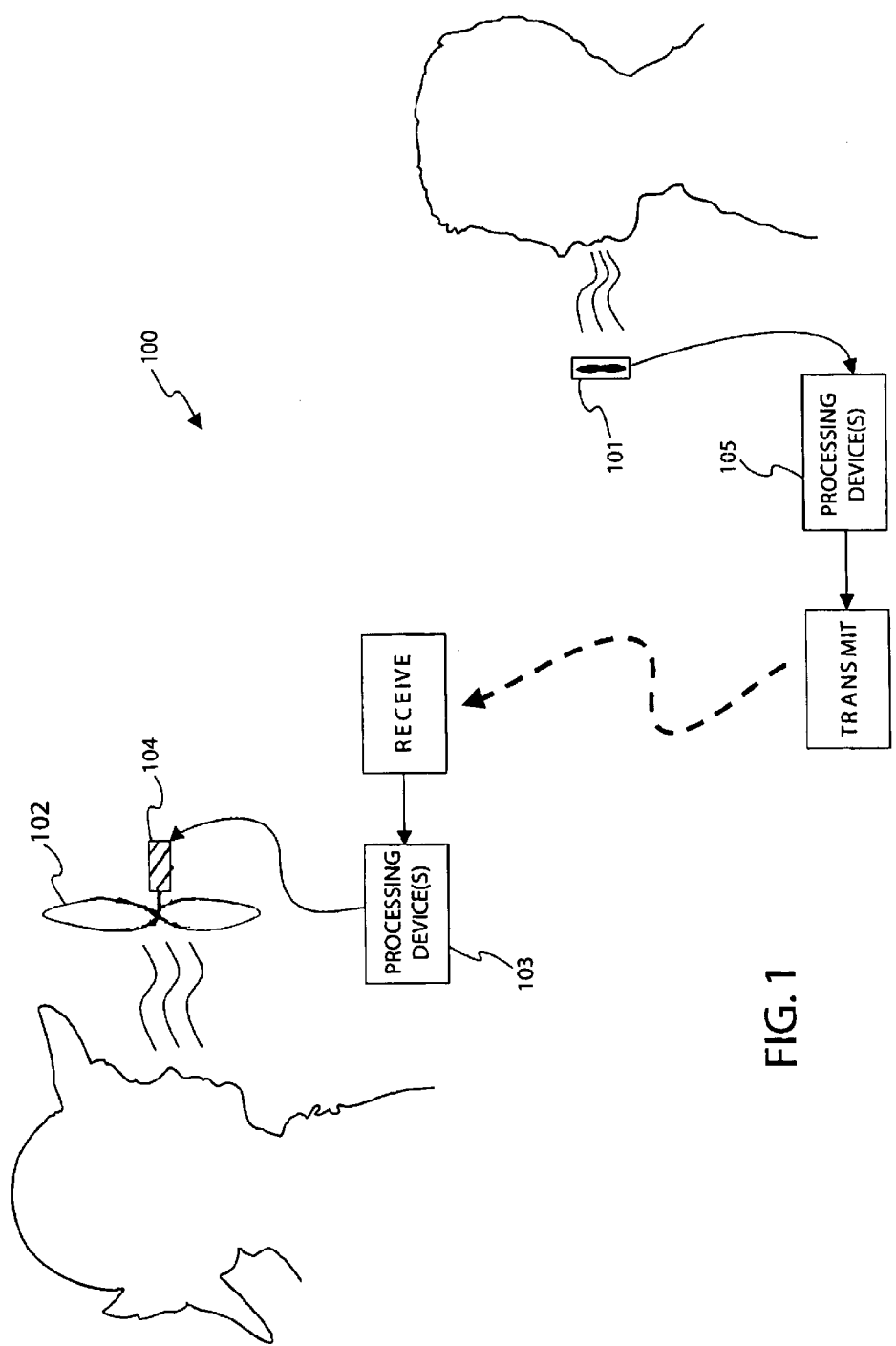
FIG. 1 illustrates an airflow transmission apparatus, according to an embodiment of the invention, in which an airflow is measured at one location and transmitted to a remote location for display at that location.

The invention provides for the acquisition of data (referred to generally herein as "airflow data") representing one or more characteristics of an input airflow (and, if necessary or desirable, processing, e.g., amplification, of the airflow data), then storage, transmission to a remote location, and/or playback (i.e., generation of a display airflow corresponding to the input airflow) of the airflow data. Aspects of the invention can be embodied in apparatus, methods and/or computer programs, as will be apparent to those skilled in the art in view of the description below.

The invention can be used for a variety of applications. For example, the invention can be used for recording, transmitting and/or playing back airflow data for an airflow produced by an animate object (e.g., a human being or an animal), such as the breath of an animate object or an airflow generated by movement of an animate object (e.g., movement of a leg or arm or a human being). The invention can also be used, for example, for recording, transmitting and/or playing back airflow data for a wind tunnel airflow.

The airflow data can be acquired in a variety of ways. In particular, as used herein, "acquisition" of airflow data can encompass measuring data representing one or more characteristics of an actual airflow (such an airflow is referred to herein as a "measured airflow"), as well as accessing data representing one or more characteristics of a simulated airflow (such an airflow is referred to herein as a "modelled airflow"). In the former case, one or more sensors adapted to sense a characteristic of an actual airflow can be used to acquire airflow data. Examples of such sensors are discussed in more detail below. In the latter case, appropriate electronic devices can be used to access airflow data for a simulated airflow. For example, a computer and associated peripheral devices can be used to access airflow data from a computational airflow model. Often, the acquired airflow data represents the velocity of an airflow, though, as discussed further below, data representing other characteristics of an airflow can be acquired in addition to, or instead of, data representing airflow velocity.

In many embodiments of the invention, the acquired airflow data is stored in an electronic, optical or other data storage medium or media. Of particular interest, storing acquired airflow data enables an airflow to be displaced in time, since the stored airflow data can be used to generate a display airflow at a future time.

The acquired airflow data can be transformed (e.g., amplified) via signal processing. (If the airflow data is stored, this can, in general, be done before and/or after storage of the airflow data. Such data transformations can be used in several ways. For example, the airflow data can be processed to enhance the dynamic range of a display generated from the airflow data in order to make the display more appropriate for a human being's senses. The airflow data can also be processed, for example, to enhance specific features of the data e.g., to amplify irregularities in breath. The airflow data can also be processed, for example, to produce a desired dramatic effect in an entertainment context, e.g., in a theme park attraction, amplification of the breath an actor for an audience. Amplification can also be used to change scale, e.g., to amplify a micro-airflow across a computer chip or scale down a global airflow to a human scale. However, in each case, the display airflow is a direct representation or a mathematical transformation of the measured airflow.

Playback of the airflow data can be effected by using the airflow data to control operation of an actuator or other mechanism to generate a display airflow that corresponds to the input airflow. For example, the airflow data can be used to control one or more fans to produce a display airflow having a velocity or velocity field in accordance with the velocity or velocity field of the input airflow. The display airflow can be produced immediately after acquisition of the airflow data or, as indicated above, the airflow data can be stored for use in later playback.

Airflow data representing a measured airflow can also be transmitted to a location remote from a location at which the airflow data is measured. (Herein, a "remote" location is a location at which a measured airflow cannot be experienced directly.) Transmission of acquired airflow data enables an airflow to be displaced in space, i.e., airflow data is transmitted across a distance to a remote location (and, typically, played back at that location). For example, air flow data can be transmitted to a remote location to enable representation of an airflow associated with a person (e.g., breath, wind resultant from movement by the person) at a distance, or to represent the airflow properties of a place or situation at a location other than that at which the airflow occurs (e.g., to display an airflow proximate to a ship or plane to the crew of the ship or plane).

FIG. 1 illustrates an apparatus 100 according to an embodiment of the invention. The apparatus 100 measures an airflow and produces a display airflow in accordance with the measured airflow at a location (the "display location") remote from the location (the "measuring location") at which the measured airflow occurred. The apparatus 100 can be constructed so that data representing the measured airflow is transmitted to the display location from the measuring location over a communications network, such as a computer network (e.g., an intranet or the Internet), a videoconferencing network, or a telephone network. As illustrated in FIG. 1, the apparatus 100 can be used, for example,.to measure a person's breath and display the measured breath to one or more different persons at the remote location. (FIG. 2, described below, illustrates an apparatus according to the invention which displays a person's breath to that same person.) However, the apparatus 100 can be used to measure and display other types of airflows. An apparatus according to the invention having the functionality of the apparatus 100 is sometimes referred to herein as an "airflow transmission apparatus" or, when used to measure and display breath, a "breath transmission apparatus."

As illustrated in FIG. 1, the apparatus 100 includes an impeller 101 into which the airflow to be measured is directed. The characteristics of the impeller 101 are established in view of the nature of the airflow to be measured. For example, the use of a very light magnetic impeller enables measurement of very gentle breath. U.S. Pat. Nos. 5,939,645 and 5,710,380 describe impellers that can be used with the invention. Impingement of the airflow on the impeller 101 causes rotation of the impeller 101, which generates an electrical signal in accordance with the rotational speed of the impeller 101. The rotational speed of the impeller 101 can be related to the velocity of the airflow, such that the velocity of the airflow is represented by the impeller rotational speed. One or more processing devices 105 (e.g., a microprocessor) connected to the impeller 101 produce data representing the impeller rotational speed from the electrical signal received from the impeller 101. The processing device(s) 105 can also be implemented to process (e.g., amplify) the data representing the impeller rotational speed in any desired manner. The impeller rotational speed data is transmitted via an appropriate transmission line to the display location at which the display of the airflow is to be generated. (As indicated above, in some applications of the invention, the impeller rotational speed data is transmitted from the measuring location to the display location via a communications network.) At the display location, one or more processing devices 103 (in some embodiments of the invention, the processing device(s) 103 and 105 can be embodied, in whole or in part, by the same processing device(s)) receive the data representing the impeller rotational speed and produce one or more commands that are communicated to a motor 104 to control operation of the motor 104. The motor 104 drives a fan 102 in response to the command(s), i.e., in response to the impeller rotational speed data, thereby producing a display airflow in accordance with the measured airflow. Electronic devices with which the apparatus 100 is implemented can be, in general, analog or digital devices. Those skilled in the art can readily appreciate that an airflow transmission apparatus according to the invention can be implemented using apparatus having other than the particular construction illustrated in FIG. 1.

The accuracy of the impeller rotational speed measurement is affected by, for example, the sample rate (i.e., how frequently samples are taken of the airflow signal), the sensor sensitivity (i.e., how sensitive the sensor is to changes in the speed of the airflow), and the sensor error (i.e., the margin of error in measurements obtained by the sensor used). These parameters can be established by those skilled in the art in view of the intended application of the invention. For example, in one embodiment of the invention, the impeller rotational speed data is updated at a rate of approximately 100 Hz; this sample rate has been found to enable sufficiently accurate reproduction of breath or wind patterns.

The apparatus 100 can be used for a variety of applications. For example, the apparatus 100 can be used as a new form of remote communication that allows people to feel each other's breath as they communicate remotely. The apparatus 100 can, for example, be used as an enhancement to telephonic or remote visual communication by adding a breath communication channel to the aural and/or visual communication channel(s). For instance, the apparatus 100 can be used to enhance telephone or video conference apparatus by enabling display of the breath of a speaker (or other ambient airflow(s)) at a first location party to the telephone call or video conference to be reproduced at a second location party to the telephone call or video conference, thus enabling the presence of those at the first location to be more keenly felt by those present at the second location.

The apparatus 10 can also be used, for example, to produce a display of wind patterns at a specified locale for use by scientists or others. One or more sensors mounted at the specified locale sense wind patterns at that locale. Data representing the sensed wind patterns could then be transmitted to a location (display location) and used to produce an airflow that duplicates the wind patterns measured at the specified locale. In particular, the display location can be inside a building at the locale at which wind patterns are measured or can be at a location that is distant from that locale. A person at the display location can perceive the wind patterns as they actually occur feeling the airflow across their skin. For example, irregularities in wind behavior would be immediately sensed. Such a visceral sense of the wind patterns would not be provided by a numerical or other visual display produced from the data representing the measured wind patterns. Such a system according to the invention can be useful to monitor wind patterns at locales at which it is impractical or undesirable for a person to experience or measure the wind pattern directly, e.g., at locales that are distant or relatively inaccessible, or at locales at which the weather is particularly inclement. Such a system according to the invention can also be used to enable airflow within a wind tunnel to be simultaneously experienced outside the wind tunnel. By providing an intuitive display of the airflow within a wind tunnel, playback of wind tunnel airflows using an apparatus according to the invention enhances the analysis and understanding of wind tunnel data.

The apparatus 100 can also be used, for example, to enhance a live performance. Data representing the measured breath of a performer can be obtained and amplified. The amplified data can then be used to produce an airflow duplicating the breath of the performer that is directed toward the audience.

The apparatus 100 can also be used, for example, to record a breath pattern for a specified period of time and replay that breath pattern one or more times. For example, the apparatus 100 can be implemented so that the breath patterns of a person are recorded so long as a button is depressed (or other appropriate interface mechanism activated). As soon as the button is released, recording of the breath pattern is stopped and the pattern is transmitted to a display location. The apparatus 100 can be implemented, for example, so that the breath pattern is automatically played back over and over by the fan 102. The apparatus 100 could also be implemented so that data representing the breath pattern is stored at the display location. An indicator (e.g., an LED) at the display location can indicate the presence of the stored breath pattern so that a person at the display location can, when desired, cause the stored breath pattern to be displayed to that person. The latter implementation is a form of breath "voicemail," i.e., a breath recording is transmitted from a remote location and stored for future display. Medical devices can also make use of the apparatus 100 to record a breath pattern for a specified period of time and replay that breath pattern. For example, an asthmatic or other sufferer of a respiratory disorder can record a breathing fit or spasm for later medical analysis. The apparatus 100 can advantageously be implemented so that recording for medical purposes is done automatically for ill patients who are bedridden.

As discussed above, the invention can be implemented so that the acquired airflow data is stored. This is the case, for example, in the application of the invention described immediately above. There are a variety of other applications which can make use of an implementation of the invention in which the acquired airflow data is stored.

For example, apparatus according to the invention can be used to record a breath pattern for use in an animatronic display. A breath pattern of a human being can be recorded. An electromechanical human being or other type of puppet can be constructed with a propeller that is positioned in, or proximate to, the mouth. The propeller is operably connected to a motor which is, in turn, connected to one or more processing devices that can be used to effect control of the motor and, thus, the propeller. Data representing the recorded breath pattern can be used to produce a display of the breath pattern using the propeller, thus giving the electromechanical human being or puppet a more human character.

Apparatus according to the invention can also be used to, for example, record important airflow events for posterity and/or scientific study. For example, an apparatus according to the invention can be used to record the wind patterns produced by a large storm, the breath patterns of a person giving an historic speech, or the breath patterns produced by a family member during special events such as the birth of a child or a family barbecue. Such an airflow can be played back at a later time so that the airflow can be directly experienced to, for example, enable analysis of the airflow or to enhance recollection of a person or event with which the airflow is associated.

Apparatus according to the invention can also be used to, for example, record an airflow within a wind tunnel for later playback. For example, in a wind tunnel, two-dimensional or three-dimensional airflow speeds can be recorded by an array of sensors and later used to generate a corresponding multi-dimensional display airflow. The display airflow can be generated at a location outside the wind tunnel (as discussed above). The display of the airflow can also be generated inside the wind tunnel, thereby enabling duplication of a particular airflow in the wind tunnel at a later time.

The invention can also enable production of a display airflow from simulated wind-tunnel airflow data. The display airflow can be played back inside or outside the wind tunnel.

Figure 2:
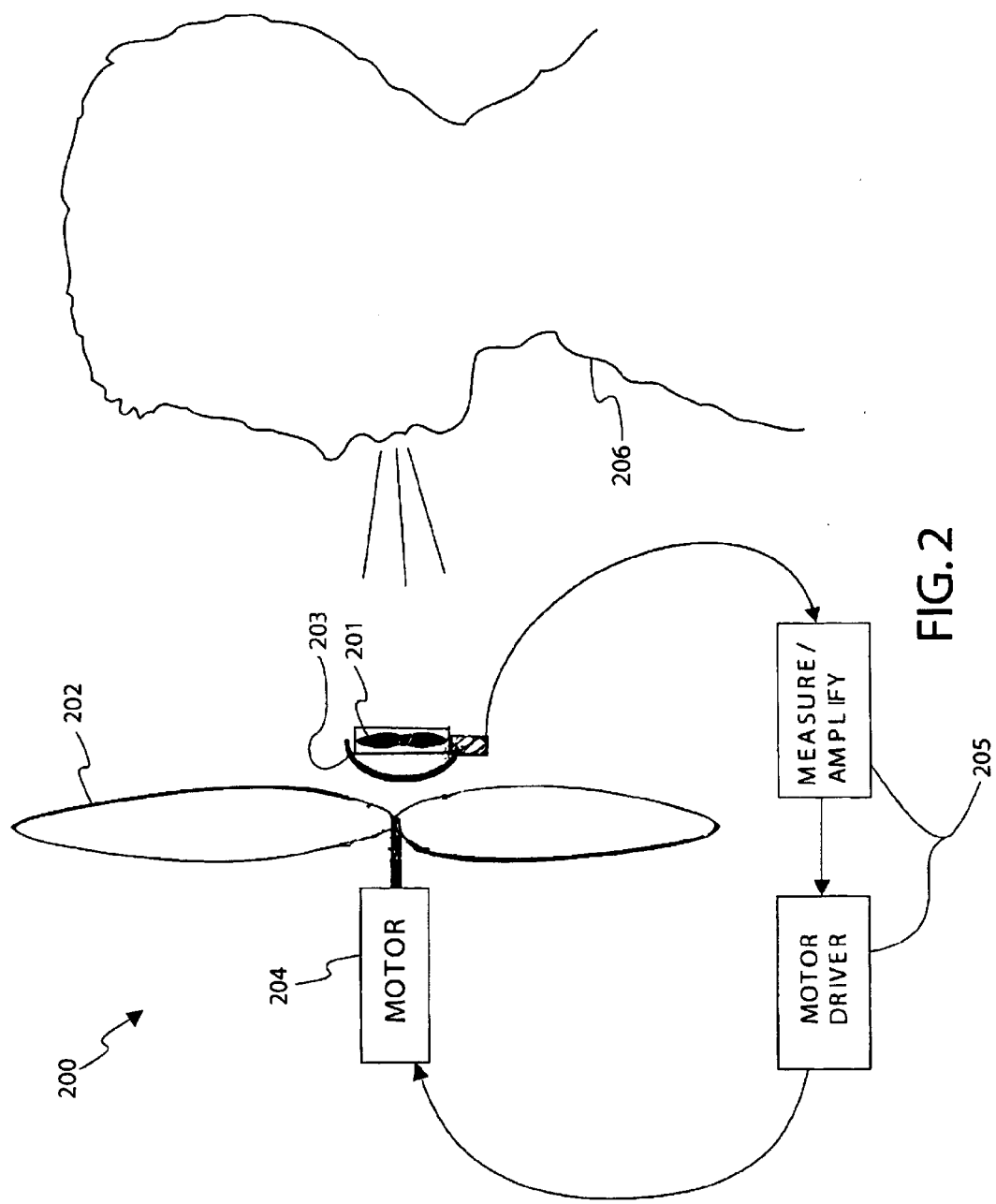
FIG. 2 illustrates a breath mirror apparatus, according to another embodiment of the invention, in which a person's breath is measured, amplified and played back into the person's face.

FIG. 2 illustrates an apparatus 200 according to another embodiment of the invention. The apparatus 200 senses a person's breath and plays back the person's breath directly in the person's face. An apparatus according to the invention having such functionality is sometimes referred to herein as a "breath mirror."

As illustrated in FIG. 2, the apparatus 200 includes an impeller 201 and fan 202 coaxially mounted such that the impeller 201 and fan 202 can rotate independent of each other. A cup 203 is positioned between the impeller 201 and fan 202 and shaped so that the impeller 201 is shielded from airflows other than the person's breath. A motor 204 is operably connected to the fan 202 so that the motor 204 can drive rotation of the fan 202. When the person 206 breathes on the impeller 201, rotation of the impeller 201 generates an electrical signal in accordance with the rotational speed of the impeller 201. The rotational speed-of the impeller 201 can be related to the velocity of the airflow, such that the velocity of the airflow is represented by the impeller rotational speed. Electrical circuitry 205 electrically connects the impeller 201 and the motor 204 so that electrical signals representing the rotational speed of the impeller 201 are transmitted to the motor 204. The electrical circuitry 205 also enables those electrical signals to be processed as necessary or desired. For example, the electrical circuitry 205 can amplify the electrical signals so that the person's breath is "played back" to the person 206 by the fan 202 with greater or lesser velocity than that of the sensed breath. The motor 204 drives rotation of the fan 202 in accordance with the electrical signal received by the motor 204, thereby displaying to the person 206 the (typically amplified) breath of the person 206. Just as a mirror provides a visual impression of oneself, the apparatus 200 enables a sense of oneself to be obtained for a different physical characteristic, one for which display apparatus providing such a sense has heretofore been unavailable. A breath mirror in accordance with the invention can be used, for example, in the training of athletes and singers to enhance their methods for breathing while performing athletic activity or singing. Those skilled in the art can readily appreciate that a breath mirror according to the invention can be implemented using apparatus having other than the particular construction illustrated in FIG. 2.

The apparatus 100 and 200 described above can be implemented so that some or all of the apparatus 100 or 200 (e.g., the impeller 101 of the apparatus 100, all of the apparatus 200) can be attached to a person (or other animate object, such as an animal). Such an implementation can be advantageously used, for example, in situations in which a person whose breath (or other associated airflow) is to be measured will be physically active. For example, the impeller 101 or the apparatus 200 can be mounted to a person using unobtrusive headgear such as that which is used to mount a microphone or harmonica on a person.

Figure 3:
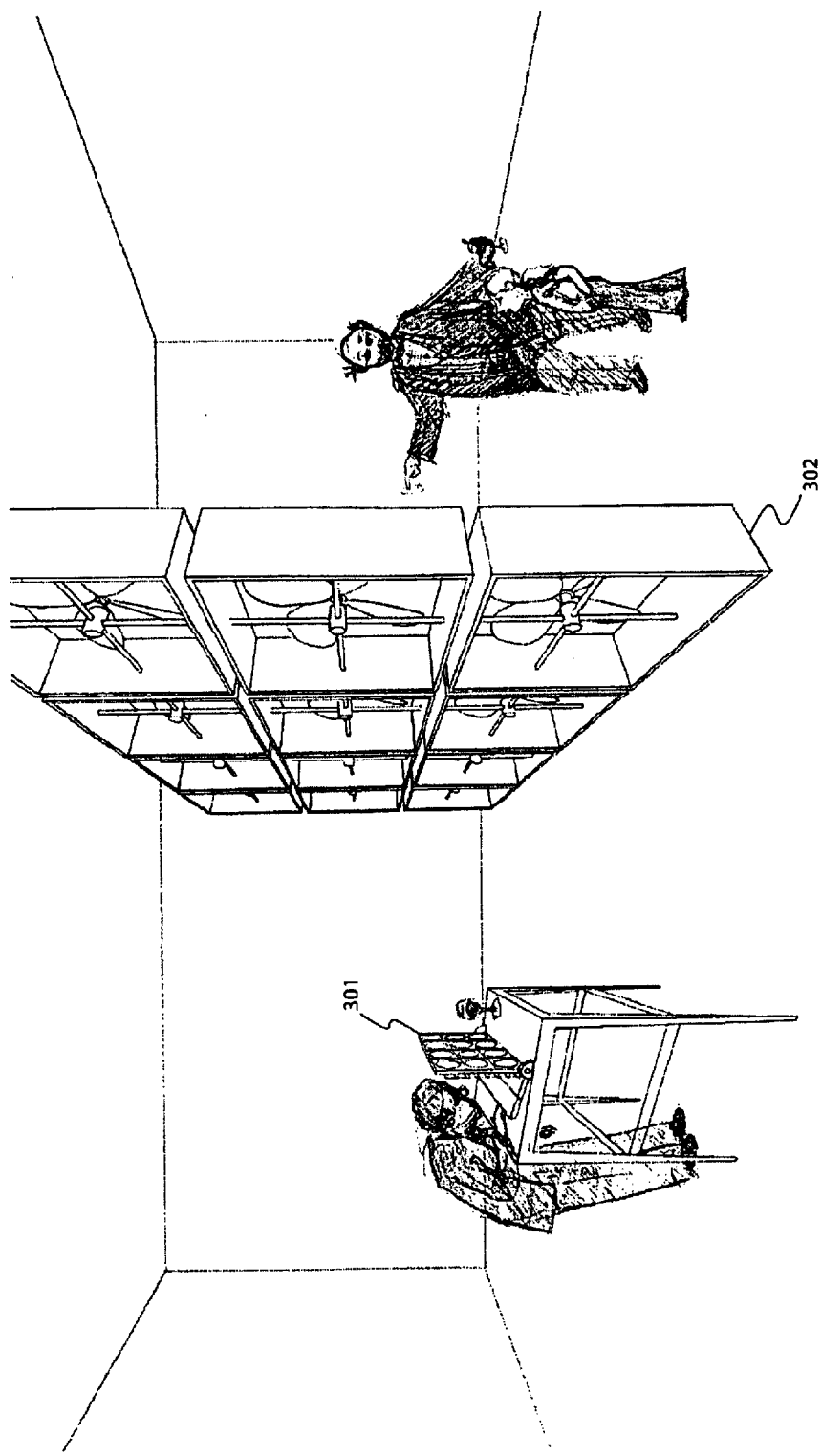
FIG. 3 illustrates an embodiment of the invention in which small-scale breath patterns sensed by an impeller array undergo large-scale amplification so that the breath patterns are displayed by a fan array as a room-sized gust.

In apparatus according to still further embodiments of the invention, multiplicities of impellers and/or propellers can be combined into arrays. FIG. 3 illustrates an embodiment of the invention in which small-scale airflow patterns sensed by an impeller array 301 undergo large-scale amplification so that the airflow patterns are displayed by a fan array 302 as a room-sized gust. (To simplify illustration of this embodiment of the invention, the apparatus that interconnect the impeller array 301 and-fan array 302 are not illustrated in FIG. 3.) As illustrated in FIG. 3, the breath of a person is measured by the impeller array 301 and transmitted to a remote location (as defined herein) for playback to people at that location using the fan array 302.

With the exception of the substitution of an impeller array for a single impeller and/or a propeller array for a single propeller, apparatus according to such embodiments of the invention can be constructed and operate in a manner similar to that described above for apparatus according to other embodiments of the invention. The processing device(s) of apparatus according to the invention including multiple impellers and propellers can be adapted to control the propellers in an appropriate manner to accurately reproduce the characteristics of the airflow as measured by the array of impellers. The processing device(s) can also be implemented so that the characteristics of the airflow are amplified prior to being used to produce the display of the airflow using the propeller(s) (e.g., the airflow can be magnified for small-scale phenomena, scaled down for high-speed phenomena, and/or enhanced and processed to accentuate specific features of the airflow). The processing device(s) of apparatus according to the invention including multiple impellers can also be adapted to process the data obtained from the multiple impellers to glean additional information regarding the measured airflow. For example, airflow velocity data obtained from an array of impellers can be combined to determine force and/or velocity characteristics for various positions within the airflow, using various methods of interpolation, differentiation and integration across the array, as known to those skilled in the art.

Apparatus according to the invention that includes multiplicities of impellers and/or propellers can be used, for example, to acquire airflow data regarding airflows in a wind tunnel. That data can be stored, displayed and/or transmitted to a remote location, as in other embodiments of the invention. Apparatus according to the invention that includes a multiplicity of propellers can be used, for example, to display output from a wind tunnel simulation to allow direct perception of the modelled airflow.

In apparatus according to the invention including multiplicities of impellers and/or propellers, the acquired airflow data can represent a 3-dimensional vector field. The playback device of such an apparatus according to the invention can portray the airflow velocity in a slice through such a vector field. Further, the apparatus according to the invention can be implemented so that the position, orientation and/or scale of the slice can be varied. The playback device can also portray the airflow velocity of an individual point within the vector field. Further, the playback device can be implemented (e.g., with individual actuators operated by servomotors) so that the airflow direction of a point sample can be portrayed.

Figure 4:
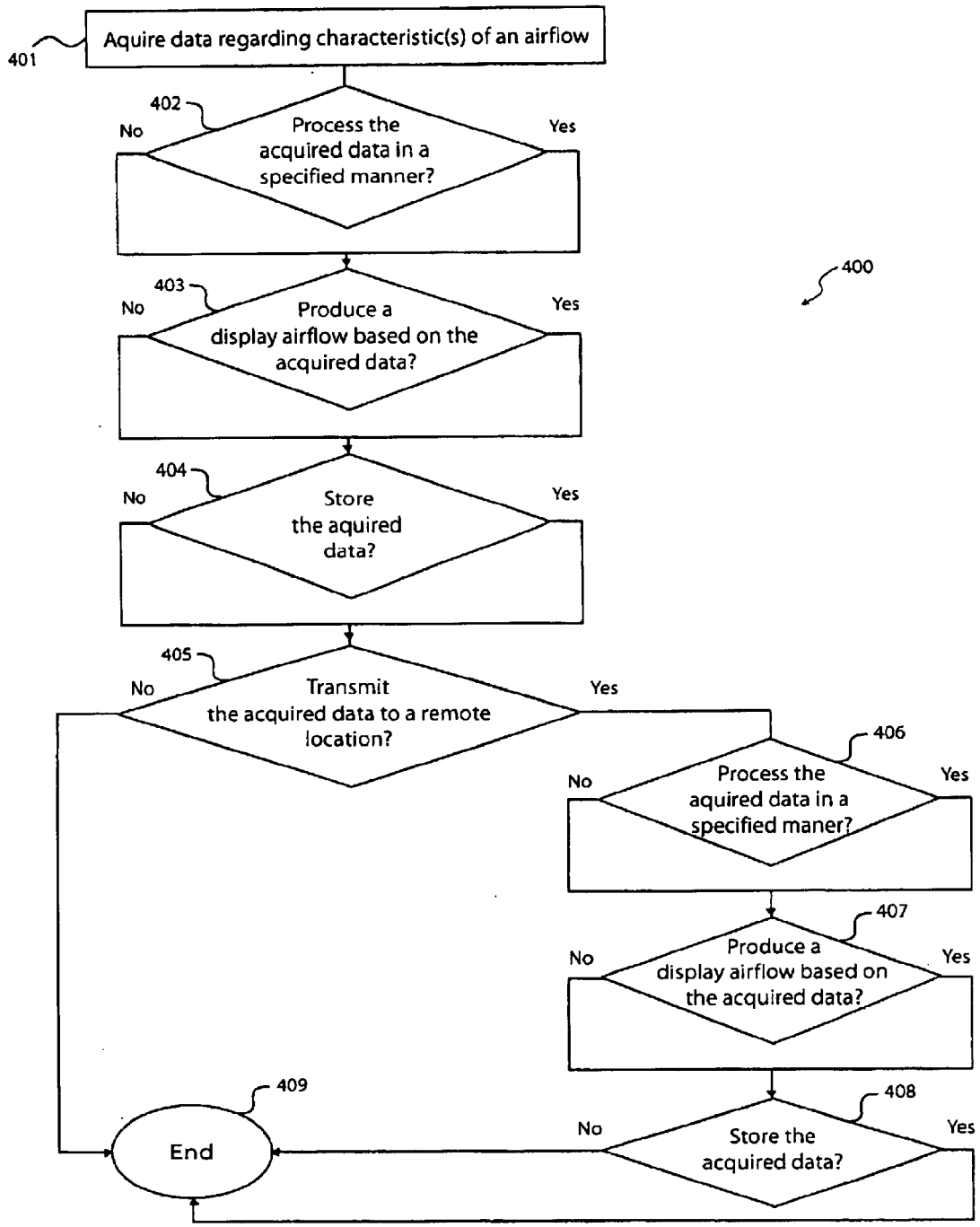
FIG. 4 is a flow chart illustrating a method in accordance with an embodiment of the invention.

FIG. 4 is a flow chart illustrating a method 400 in accordance with an embodiment of the invention. The method 400 can be implemented using apparatus according to the invention as described above. In the method 400, data acquired regarding one or more characteristics of an airflow can be stored, displayed, and/or transmitted to a remote location (at which location the acquired data can be stored and/or displayed).

In step 401 of the method 400, data regarding one or more characteristics of an airflow is acquired. The acquisition of airflow data is described in more detail elsewhere herein. Acquisition of airflow data can encompass measuring data representing one or more characteristics of an actual airflow (measured airflow), as well as accessing data representing one or more characteristics of a simulated airflow (modelled airflow). It is anticipated that the invention will often be implemented so that the acquired airflow data is data regarding the velocity of the airflow. However, other types of airflow data can be acquired in addition to, or instead of, airflow velocity data, such as data regarding the direction of the airflow, the temperature of the airflow, the humidity of the airflow and/or the odor of the airflow.

In step 402 of the method 400, a determination is made as to whether the airflow data is to be processed in some manner. For example, often the airflow data is acquired by an analog sensing device. In such case, the analog data can be converted to digital data. Additionally, as can be readily understood by those skilled in the art, both the analog and digital data can be conditioned, filtered and/or amplified, as necessary or desirable to facilitate use of the data by apparatus according to the invention. Other ways in which the data can be processed to achieve a particular desired transformation of the airflow data are described in more detail above. Though processing of the airflow data is shown as a separate step in the method 400, it should be noted that processing of the airflow data can also occur as part of other steps of the method 400, either in addition to, or instead of, the step 402.

Whether or not the airflow data is processed in step 402, in step 403 of the method 400 a determination is made as to whether to generate a display airflow based on the airflow data. The display airflow can be a direct reproduction of the input airflow. Or, the display airflow can be a modified version of the input airflow. In the latter case, for example, the velocity of the display airflow can be a specified multiple of the input airflow, such that the display airflow is faster or slower than the input airflow.

Whether or not the airflow data is used to generate a display airflow in step 403, in step 404 of the method 400 a determination is made as to whether to store the airflow data. Storing the airflow data can be useful, for example, to enable generation of a display airflow at a later time.

Whether or not the airflow data is stored in step 404, in step 405 of the method 400 a determination is made as to whether to transmit the airflow data to a remote location. If the airflow data is not transmitted to a remote location, then the method 400 ends. If, on the other hand, the airflow data is transmitted to a remote location, then the airflow data can be stored at the remote location and/or used to produce a display airflow at the remote location. The airflow data can be transmitted to a remote location using any appropriate methods and apparatus at the measuring and display locations, e.g., using analog or digital protocol(s) to transmit the data by wire, bus, network or wireless data transmission apparatus.

If, in step 405, the airflow data is transmitted to a remote location, then, in step 406 of the method 400, a determination is made as to whether the airflow data is to be processed in some manner. Processing as described above with respect to step 402 of the method 400 and elsewhere herein can be performed. Processing of the airflow data at the remote location can also occur as part of steps 407 or 408 (described below) of the method 400, either in addition to, or instead of, the step 402.

Whether or not the airflow data is processed in the step 406, in step 407 of the method 400 a determination is made as to whether to generate a display airflow based on the airflow data. The display airflow can be produced as described above with respect to step 403 of the method 400 and elsewhere herein.

Whether or not the airflow data is used to generate a display airflow in the step 407, in step 408 of the method 400, a determination is made as to whether to store the airflow data at the remote location. Whether or not the LW airflow data is stored in the step 408, the method 400 ends, as shown by the block 409.

In the embodiments of the invention described above, airflow velocity is sensed using an impeller. However, generally, any appropriate device that can measure airflow velocity can be used with the invention. Many such devices are known to those skilled in the art. For example, instead of an impeller, an anemometer (e.g., a hot-wire anemometer) can be used to measure airflow velocity. The device used can be chosen in view of the trade-offs among sensitivity, range and ease of calibration associated with each type and instance of device. For example, hot-wire anemometers are difficult to calibrate for various ambient temperatures and thus may be undesirable for use in some temperature environments, while impeller devices have less sensitivity at the low-end of their range and thus may be undesirable for use in some low velocity applications.

In the embodiments of the invention described above, data regarding the velocity of an airflow is acquired and stored, transmitted and/or played back. The invention can be implemented so that data regarding an airflow is acquired (and stored, transmitted and/or played back) in addition to, or instead of, data regarding the velocity of the airflow. In particular, when used together with data regarding airflow velocity, data regarding characteristics of an airflow other than velocity can advantageously enhance the fidelity of the playback of the airflow data.

For example, data can be acquired regarding airflow direction. Airflow direction data can be acquired using, for example, a movable impeller that is mounted to enable the orientation of the impeller to change while airflow velocity data is being acquired. Or, for example, data can be acquired regarding airflow temperature. Airflow temperature data can be acquired using, for example, a thermistor or other temperature sensor. Or, for example, data can be acquired regarding airflow moisture content (i.e., airflow humidity). Airflow humidity data can be acquired using, for example, a humidity sensor. Or, for example, data can be acquired regarding airflow odor. Airflow odor data can be acquired using, for example, odor sensors that measure scent by determining the presence of chemicals using spectral analyses or reactive chemical technologies. Data acquired regarding characteristics of an airflow other than velocity can then be used in producing a display of the measured airflow. For example, airflow direction can be reproduced using a fan mounted on an orienting motor that is operated to change the orientation of the fan in a desired manner as the fan is used to produce an airflow. Airflow temperature can be reproduced using a heating/cooling element such as a peltier junction. Airflow moisture content can be reproduced using a humidifier. Airflow odor can be reproduced using a "scent synthesizer" (i.e., a device which contains reservoirs of chemicals that are combined to synthesize natural scents), such as the iSmell scent synthesizer sold by Digiscents or a scent synthesizer as described in U.S. Pat. No. 5,724,256.

As indicated above, the invention can be used for acquired and storing, displaying and/or transmitting data representing an airflow produced by motion of a human being (or other animate object). Used in this way, the invention enables the recording of human movement in a manner that is far less intrusive than previous approaches to recording human movement. For example, the difference between the intrusiveness of the instant invention and that of electromechanical motion capture apparatus (discussed above) is analogous to the difference between the intrusiveness of a computer monitor and that of three-dimensional virtual reality goggles. To see anything else, a person has to remove the goggles, but can simply turn their head away from a computer monitor. Similarly, a person cannot easily shed an electromechanical motion capture measurement apparatus, while, as is readily apparent from the description above, a person can easily move away from an apparatus according to the invention for measuring wind or breath.

The invention can be implemented in half-duplex or full-duplex mode. In half-duplex mode, airflow measurement apparatus is present at one location while airflow display apparatus is present at a second, different location, thus enabling an airflow at the first location to be measured and displayed at the second location. In full-duplex mode, both airflow measurement and airflow display apparatus are present at both of the first and second locations, thus enabling an airflow at the first location to be measured and displayed at the second location, and an airflow at the second location to be measured and displayed at the first location. Half-duplex mode would be appropriate, for example, for a system according to the invention, as described above, that is used to measure wind patterns at a specified locale and display the wind patterns at another location. Full-duplex mode can be appropriate, for example, for a system according to the invention, as described above, that is used to enhance a telephone system or a video-conferencing system Various embodiments of the invention have been described. The descriptions are intended to be illustrative, not limitative. Thus, it will be apparent to one skilled in the art that certain modifications may be made to the invention as described herein without departing from the scope of the claims set out below.

I claim:

1. Apparatus, comprising:

means for acquiring airflow data representing a characteristic of a measured airflow that occurs at a first location;

means for effecting transmission of the airflow data via a video-conferencing network from the first location to a second location that is remote from the first location; and means for producing a display airflow at the second location, wherein the characteristic of the measured airflow is reproduced in the display airflow in accordance with the airflow data.

2. Apparatus, comprising:

means, located at a first location, for acquiring a first set of airflow data representing a characteristic of a first measured airflow that occurs at the first location;

means, located at a second location that is remote from the first location, for acquiring a second set of airflow data representing a characteristic of a second measured airflow that occurs at the second location;

means for effecting transmission of airflow data between the first and second locations, thus enabling the first set of airflow data to be transmitted from the first location to the second location and the second set of airflow data to be transmitted from the second location to the first location;

means, located at the second location, for producing a first display airflow in which the characteristic of the first measured airflow is reproduced in the first display airflow in accordance with the first set of airflow data; and means, located at the first location, for producing a second display airflow in which the characteristic of the second measured airflow is reproduced in the second display airflow in accordance with the second set of airflow data.

3. Apparatus, comprising:

means for acquiring airflow data representing the velocity of a measured airflow;

means for producing a display airflow in which the velocity of the measured airflow is reproduced in the display airflow in accordance with the airflow data; and means for modifying the airflow data so that the velocity of the display airflow is increased or decreased with respect to the velocity of the measured airflow.

4. A method comprising the steps of:

acquiring airflow data representing the velocity of a measured airflow;

producing a display airflow in which the velocity of the measured airflow is reproduced in the display airflow in accordance with the airflow data; and modifying the airflow data so that the velocity of the display airflow is increased or decreased with respect to the velocity of the measured airflow.

5. A method comprising the steps of:

acquiring a first set of airflow data representing a characteristic of a first measured airflow that occurs at a first location;

acquiring a second set of airflow data representing a characteristic of a second measured airflow that occurs at a second location that is remote from the first location;

effecting transmission of the first set of airflow data from the first location to the second location;

effecting transmission of the second set of airflow data from the second location to the first location;

producing a first display airflow at the second location, wherein the characteristic of the first measured airflow is reproduced in the first display airflow in accordance with the first set of airflow data; and producing a second display airflow at the first location, wherein the characteristic of the second measured airflow is reproduced in the second display airflow in accordance with the second set of airflow data.

6. A method comprising the steps of:

acquiring airflow data representing a characteristic of a measured airflow that occurs at a first location;

effecting transmission of the airflow data via a video-conferencing network from the first location to a second location that is remote from the first location; and producing a display airflow at the second location, wherein the characteristic of the measured airflow is reproduced in the display airflow in accordance with the airflow data.

7. Apparatus as in claim 1, wherein the characteristic is airflow velocity.

8. Apparatus as in claim 1, wherein the characteristic is airflow direction.

9. Apparatus as in claim 1, wherein the characteristic is airflow temperature.

10. Apparatus as in claim 1, wherein the characteristic is airflow humidity.

11. Apparatus as in claim 1, wherein the characteristic is airflow odor.

12. Apparatus as in claim 1, wherein the airflow is produced by an animate object.

13. Apparatus as in claim 12, wherein the airflow is the breath of an animate object.

14. Apparatus as in claim 12, wherein the airflow is generated by movement of an animate object.

15. Apparatus as in claim 1, further comprising:

means, located at the second location, for acquiring airflow data representing a characteristic of a second measured airflow that occurs at the second location; and means, located at the first location, for producing a second display airflow, wherein the characteristic of the second measured airflow is reproduced in the second display airflow in accordance with the airflow data representing the characteristic of the second measured airflow.

16. Apparatus as in claim 1, further comprising means for storing the airflow data.

17. Apparatus as in claim 1, wherein the means for acquiring airflow data comprises a plurality of sensors arranged in an array.

18. Apparatus as in claim 17, wherein the means for producing a display airflow comprises a plurality of airflow output devices arranged in an array.

19. Apparatus as in claim 2, wherein the characteristic of the first measured airflow and/or the characteristic of the second measured airflow is airflow velocity.

20. Apparatus as in claim 2, wherein the characteristic of the first measured airflow and/or the characteristic of the second measured airflow is airflow direction.

21. Apparatus as in claim 2, wherein the characteristic of the first measured airflow and/or the characteristic of the second measured airflow is airflow temperature.

22. Apparatus as in claim 2, wherein the characteristic of the first measured airflow and/or the characteristic of the second measured airflow is airflow humidity.

23. Apparatus as in claim 2, wherein the characteristic of the first measured airflow and/or the characteristic of the second measured airflow is airflow odor.

24. Apparatus as in claim 2, further comprising means for processing the first and/or second set of airflow data to transform the first and/or second, respectively, set of airflow data in a specified manner.

25. Apparatus as in claim 2, wherein airflow data is transmitted between the first location and the second location via a communications network.

26. Apparatus as in claim 25, wherein airflow data is transmitted between the first location and the second location via a computer network.

27. Apparatus as in claim 25, wherein airflow data is transmitted between the first location and the second location via a video-conferencing network.

28. Apparatus as in claim 25, wherein airflow data is transmitted between the first location and the second location via a telephone network.

29. Apparatus as in claim 2, further comprising means for storing airflow data.

30. Apparatus as in claim 29, wherein the means for storing airflow data comprises means, located at the first location, for storing airflow data.

31. Apparatus as in claim 30, wherein the means for storing airflow data comprises means, located at the second location, for storing airflow data.

32. Apparatus as in claim 2, wherein the means for acquiring a first set of airflow data comprises a plurality of sensors arranged in an array.

33. Apparatus as in claim 32, wherein the means for producing a first display airflow comprises a plurality of airflow output devices arranged in an array.

34. Apparatus as in claim 32, wherein the means for acquiring a second set of airflow data comprises a plurality of sensors arranged in an array.

35. Apparatus as in claim 34, wherein:
the means for producing a first display airflow comprises a first plurality of airflow output devices arranged in an array; and
the means for producing a second display airflow comprises a second plurality of airflow output devices arranged in an array.

36. Apparatus as in claim 3, wherein the airflow is produced by an animate object.

37. Apparatus as in claim 36, wherein the airflow is the breath of an animate object.

38. Apparatus as in claim 36, wherein the airflow is generated by movement of an animate object.

39. Apparatus as in claim 3, wherein the measured airflow occurs at a first location, the apparatus further comprising means for effecting transmission of the airflow data from the first location so that the display airflow is produced at a second location that is remote from the first location.

40. Apparatus as in claim 39, wherein the airflow data is transmitted from the first location to the second location via a communications network.

41. Apparatus as in claim 40, wherein the airflow data is transmitted from the first location to the second location via a computer network.

42. Apparatus as in claim 40, wherein the airflow data is transmitted from the first location to the second location via a telephone network.

43. Apparatus as in claim 3, further comprising means for storing the airflow data.

44. Apparatus as in claim 3, wherein the means for acquiring airflow data comprises a plurality of sensors arranged in an array.

45. Apparatus as in claim 44, wherein the means for producing a display airflow comprises a plurality of airflow output devices arranged in an array.

46. Apparatus as in claim 3, further comprising means for acquiring airflow data representing the direction of the measured airflow, and wherein the means for producing a display airflow is adapted to produce the display airflow in accordance with the airflow data representing the direction of the measured airflow.

47. Apparatus as in claim 3, further comprising means for acquiring airflow data representing the temperature of the measured airflow, and wherein the means for producing a display airflow is adapted to produce the display airflow in accordance with the airflow data representing the temperature of the measured airflow.

48. Apparatus as in claim 3, further comprising means for acquiring airflow data representing the humidity of the measured airflow, and wherein the means for producing a display airflow is adapted to produce the display airflow in accordance with the airflow data representing the humidity of the measured airflow.

49. Apparatus as in claim 3, further comprising means for acquiring airflow data representing the odor of the measured airflow, and wherein the means for producing a display airflow is adapted to produce the display airflow in accordance with the airflow data representing the odor of the measured airflow.

50. Apparatus as in claim 40, wherein the airflow data is transmitted from the first location to the second location via a video-conferencing network.

51. Apparatus as in claim 39, further comprising:
means, located at the second location, for acquiring airflow data representing a characteristic of a second measured airflow that occurs at the second location; and
means, located at the first location, for producing a second display airflow in which the characteristic of the second measured airflow is reproduced in the second display airflow in accordance with the airflow data.

52. Apparatus as in claim 51, wherein the characteristic of the second measured airflow is airflow velocity.

53. Apparatus as in claim 52, further comprising means for modifying the airflow data representing the velocity of the second measured airflow so that the velocity of the second display airflow is increased or decreased with respect to the velocity of the second measured airflow.

54. A method as in claim 4, wherein the measured airflow occurs at a first location, the method further comprising the step of effecting transmission of airflow data from the first location so that the display airflow is produced at a second location that is remote from the first location.

55. A method as in claim 4, further comprising the step of storing airflow data.

* * * * *